(12) United States Patent
Yasuda et al.

(10) Patent No.: US 9,071,353 B2
(45) Date of Patent: Jun. 30, 2015

(54) OPTICAL MODULE, OPTICAL TRANSMISSION DEVICE AND METHOD OF MANUFACTURING OPTICAL TRANSMISSION DEVICE

(71) Applicant: HITACHI CABLE, LTD., Tokyo (JP)

(72) Inventors: Hiroki Yasuda, Mito (JP); Yoshinori Sunaga, Hitachinaka (JP); Kouki Hirano, Hitachinaka (JP); Juhyun Yu, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 218 days.

(21) Appl. No.: 13/744,687

(22) Filed: Jan. 18, 2013

(65) Prior Publication Data

US 2013/0195470 A1 Aug. 1, 2013

(30) Foreign Application Priority Data

Jan. 27, 2012 (JP) ................. 2012-015826

(51) Int. Cl.
  *G02B 6/12* (2006.01)
  *H04B 10/25* (2013.01)
  (Continued)

(52) U.S. Cl.
  CPC ....... *H04B 10/2504* (2013.01); *Y10T 29/49002* (2015.01); *G02B 6/428* (2013.01);
  (Continued)

(58) Field of Classification Search
  CPC ............ G02B 6/42; G02B 6/12; G02B 6/428; G02B 6/4281; G02B 6/4284; H04B 10/25; H04B 10/2504; H04B 10/80; H04B 10/801
  USPC ............... 385/14–15; 398/140–141, 200–201
  See application file for complete search history.

(56) References Cited

U.S. PATENT DOCUMENTS

| 5,500,869 A | 3/1996 | Yoshida et al. |
| 2008/0138007 A1 | 6/2008 | Okubo et al. |
| 2008/0175530 A1* | 7/2008 | Song et al. ...................... 385/14 |
| 2010/0215325 A1* | 8/2010 | Tamura et al. .................. 385/89 |
| 2011/0052205 A1* | 3/2011 | Yu et al. ........................ 398/142 |

(Continued)

FOREIGN PATENT DOCUMENTS

| JP | 06-075137 | 3/1994 |
| JP | 2004-133486 | 4/2004 |

(Continued)

OTHER PUBLICATIONS

Japanese Office Action dated Feb. 24, 2015 and English translation of the Notification of Reasons for Refusal.

*Primary Examiner* — Ryan Lepisto
*Assistant Examiner* — Guy Anderson
(74) *Attorney, Agent, or Firm* — Roberts Mlotkowski Safran & Cole P.C.

(57) ABSTRACT

An optical module includes a circuit board having flexibility, a photoelectric conversion element mounted on a mounting surface of the circuit board, a semiconductor circuit element mounted on the mounting surface of the circuit board and electrically connected to the photoelectric conversion element, a plate-shaped optical connection member having a groove into which an end part of an optical fiber is pushed so as to be housed and optically connecting the optical fiber and the photoelectric conversion element, and a supporting member arranged so as to sandwich the optical connection member between the circuit board. The groove is formed between the semiconductor circuit element and the supporting member so as to have an opening into which the optical fiber is pushed at the supporting member side. The semiconductor circuit element has a height from the mounting surface of the circuit board higher than the photoelectric conversion element.

17 Claims, 12 Drawing Sheets

(51) Int. Cl.
　　*B29D 11/00*　　(2006.01)
　　*G02B 6/42*　　(2006.01)
　　*H04B 10/80*　　(2013.01)

(52) U.S. Cl.
　　CPC ............... *G02B 6/4284* (2013.01); *G02B 6/12* (2013.01); *G02B 6/42* (2013.01); *G02B 6/4281* (2013.01); *H04B 10/80* (2013.01); *H04B 10/25* (2013.01); *H04B 10/801* (2013.01); *B29D 11/00* (2013.01); *G02B 6/4214* (2013.01); *G02B 6/423* (2013.01)

(56) References Cited

U.S. PATENT DOCUMENTS

| 2012/0076454 | A1* | 3/2012 | Shiraishi | 385/14 |
| 2012/0181535 | A1* | 7/2012 | Ito et al. | 257/48 |
| 2012/0183253 | A1* | 7/2012 | Yasuda et al. | 385/14 |
| 2012/0207438 | A1* | 8/2012 | Yu et al. | 385/101 |

FOREIGN PATENT DOCUMENTS

| JP | 2007-094193 | 4/2007 |
| JP | 2011-095295 A | 5/2011 |

\* cited by examiner

COVERLAY 20

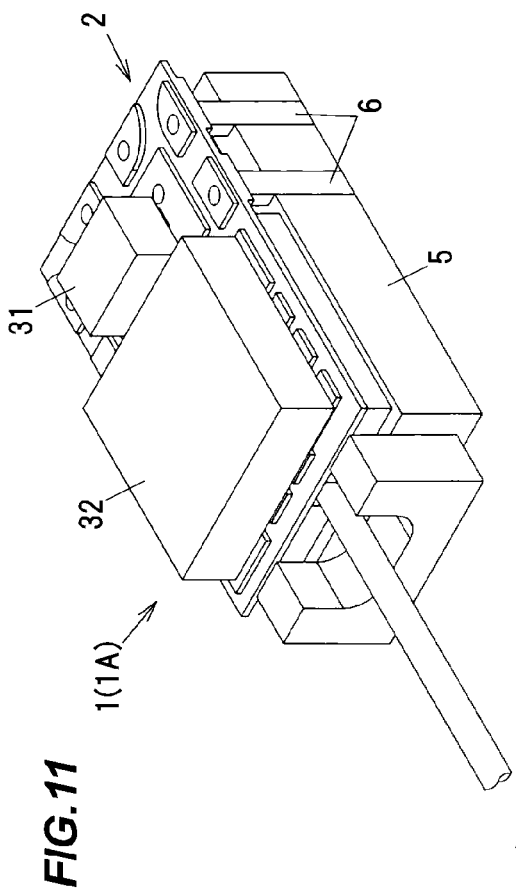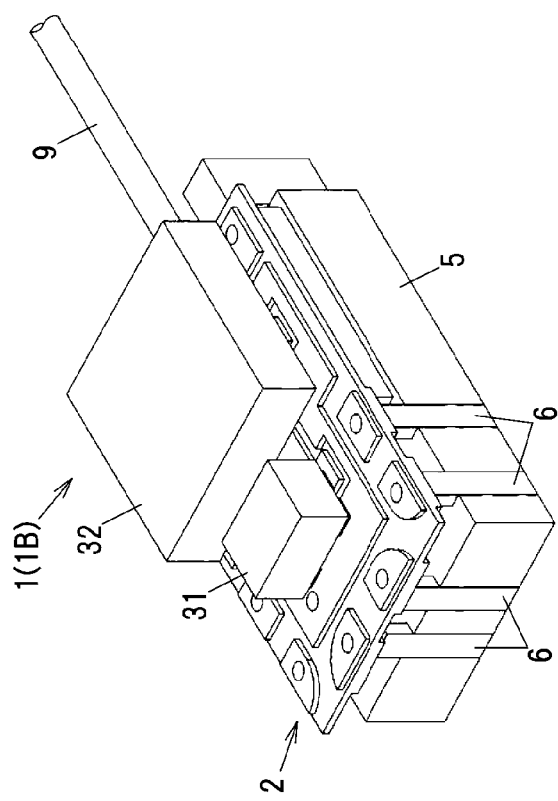
FIG.11

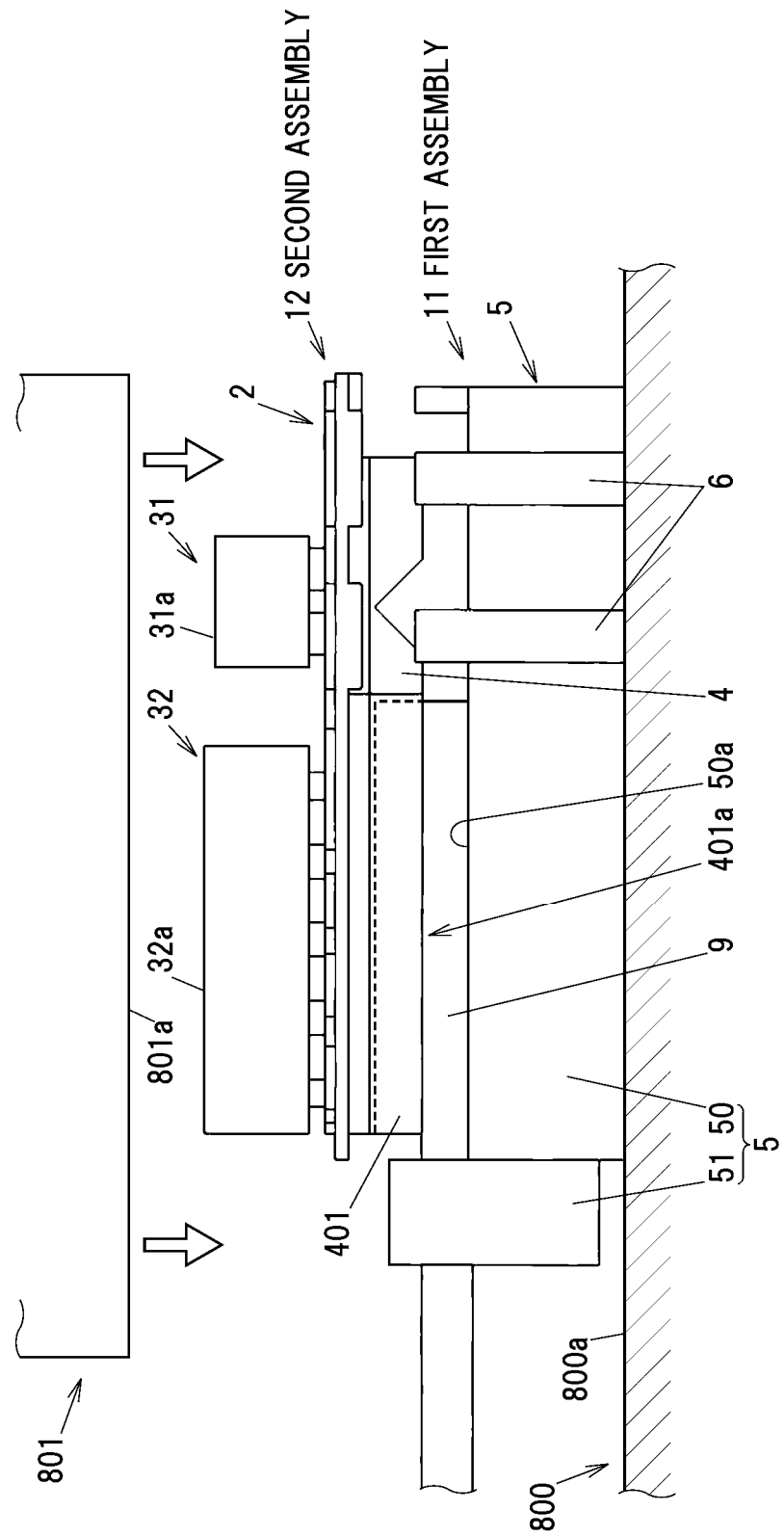

OPTICAL MODULE, OPTICAL TRANSMISSION DEVICE AND METHOD OF MANUFACTURING OPTICAL TRANSMISSION DEVICE

The present application is based on Japanese patent application No. 2012-015826 filed on Jan. 27, 2012, the entire contents of which are incorporated herein by reference.

BACKGROUND OF THE INVENTION

1. Field of the Invention

This invention relates an optical module configured to carry out transmission of a signal via an optical fiber, an optical transmission device including the optical module, and a method of manufacturing the optical transmission device.

2. Description of the Related Art

Conventionally, an optical module is known, the optical module including a photoelectric conversion element configured to convert electric energy to optical energy or optical energy to electric energy, and carrying out transmission or receipt of signal via an optical fiber (for example, refer to JP-A-2011-095295).

The optical module disclosed in JP-A-2011-095295 includes plate-shaped first to fourth substrates, an IC substrate, and a connector configured to electrically connect the optical module the circuit device. A light emitting element or a light receiving element is mounted in the first substrate. A circuit configured to transmit an electric signal to the light emitting element or a circuit configured to amplify an electric signal of the light receiving element is formed in the IC substrate. An insertion guide groove into which the optical fiber is inserted is formed in the second substrate, and the optical fiber inserted into the insertion guide groove is sandwiched between the second substrate and the third substrate. The first substrate and the IC substrate are mounted on the top surface of the fourth substrate. In addition, the IC substrate is situated opposite the second substrate and the third substrate in relation to the first substrate.

SUMMARY OF THE INVENTION

In recent years, with the spread of optical communication, an optical module has been installed in various devices. In addition, depending on the device, it may be strongly desired that the optical module is desired in size and weight. The use application of the optical module includes, e.g., communications between an operating portion (i.e., a keyboard mounting portion) and a display portion (i.e., a display mounting portion) of a folding or sliding mobile phone.

If the optical module disclosed in JP-A-2011-095295 needs to be reduced in the whole length (i.e., the length in the extension direction of the optical fiber), it may be predictable to shorten the insertion guiding member by, e.g., downsizing the second substrate and the third substrate. However, if the insertion guiding member is shortened, the optical fiber may be reduced in retention rigidity so that the optical fiber may be easily removed therefrom. Thus, there is a structural restriction in shortening the whole length of the optical module.

Accordingly, it is an object of the invention to provide an optical module that can be downsized while securing the retention rigidity for the optical fiber, as well as an optical transmission device including the optical module and a manufacturing method of the optical transmission device.

(1) According to one embodiment of the invention, an optical module comprises:

a circuit board having flexibility;

a photoelectric conversion element mounted on a mounting surface of the circuit board;

a semiconductor circuit element mounted on a mounting surface of the circuit board and electrically connected to the photoelectric conversion element;

a plate-shaped optical connection member having a groove into which an end part of an optical fiber is pushed so as to be housed and optically connecting the optical fiber and the photoelectric conversion element; and a supporting member arranged so as to sandwich the optical connection member between the circuit board, wherein the groove is formed between the semiconductor circuit element and the supporting member so as to have an opening into which the optical fiber is pushed at the supporting member side, and wherein the semiconductor circuit element has a height from the mounting surface of the circuit board higher than the photoelectric conversion element.

(2) According to another embodiment of the invention, an optical transmission device comprises:

an optical fiber; and an optical module connected to the end part of the optical fiber, wherein the optical module comprises:

a circuit board having flexibility;

a photoelectric conversion element mounted on a mounting surface of the circuit board;

a semiconductor circuit element mounted on the mounting surface of the circuit board and electrically connected to the photoelectric conversion element;

a plate-shaped optical connection member having a groove into which an end part of an optical fiber is pushed so as to be housed and optically connecting the optical fiber and the photoelectric conversion element; and a supporting member arranged so as to sandwich the optical connection member between the circuit board, wherein the groove is formed between the semiconductor circuit element and the supporting member so as to have an opening into which the optical fiber is pushed at the supporting member side, and wherein the semiconductor circuit element has a height from the mounting surface of the circuit board higher than the photoelectric conversion element.

In the above embodiment (1) or (2) of the invention, the following modifications and changes can be made.

(i) The semiconductor circuit element comprises a first terminal row and a second terminal row each of which comprises a plurality of terminals connected to the electrodes of the circuit board and linearly arranged, wherein the terminals of the first terminal row and the second terminal row are connected to the electrodes so as to sandwich the groove therebetween, and wherein a distance between a connection point of the first terminal row to the electrodes and a connection point of the second terminal row to the electrodes is more than a width of the groove.

(ii) The semiconductor circuit element further comprises at least one terminal between the first terminal row and the second terminal row, at least a part of the one terminal facing the groove via the circuit board.

(iii) The semiconductor circuit element further comprises a third terminal row configured such that a plurality of terminals connected to the electrodes of the circuit board are arranged between the first terminal row and the second terminal row, wherein a center-to-center distance between a pair of terminals of the third terminal row arranged so as to sandwich the groove is more than the width of the groove.

(iv) An intermediate position of the connection point of the first terminal row to the electrodes and the connection point of the second terminal row to the electrodes corresponds to the groove.

(v) The groove is formed so as to pass through between the semiconductor circuit element and the supporting member in a longitudinal direction of the circuit board.

(vi) The semiconductor circuit element has rigidity higher than the circuit board.

(vii) The supporting member has optical transparency.

(viii) The distance between a pair of the terminals of the third terminal row arranged so as to sandwich the groove is less than the width of the groove.

(3) According to another embodiment of the invention, a method of manufacturing the optical transmission device according to the embodiment (2) comprises:

arranging the end part of the optical fiber in the opening side of the groove; and bringing a pushing member having a flat pushing surface into contact with the semiconductor circuit element, and pushing the optical connection member to the supporting member side via the semiconductor circuit element and the circuit board so as to push the optical fiber into the groove.

POINTS OF THE INVENTION

According to one embodiment of the invention, an optical module is constructed such that a semiconductor circuit element, a circuit board and an optical connection member are disposed being overlapped with an optical fiber on a supporting member and the optical fiber is sandwiched between the circuit board and the supporting member. Thus, since the retention rigidity for retaining the optical fiber therebetween increases, the entire optical module can be downsized even when the length of a groove to enclose the optical fiber therein decreases.

BRIEF DESCRIPTION OF THE DRAWINGS

The preferred embodiments according to the invention will be explained below referring to the drawings, wherein:

FIG. 11 is a perspective view schematically showing one composition example of an optical transmission device; and FIG. 12 is an explanatory view schematically showing one example of a manufacturing process of the optical transmission device.3

DETAILED DESCRIPTION OF THE PREFERRED EMBODIMENTS

Hereinafter, one composition example of the optical module and the optical transmission device according to the embodiment of the invention will be explained referring to FIGS. 1 to 11.

Figure 1:
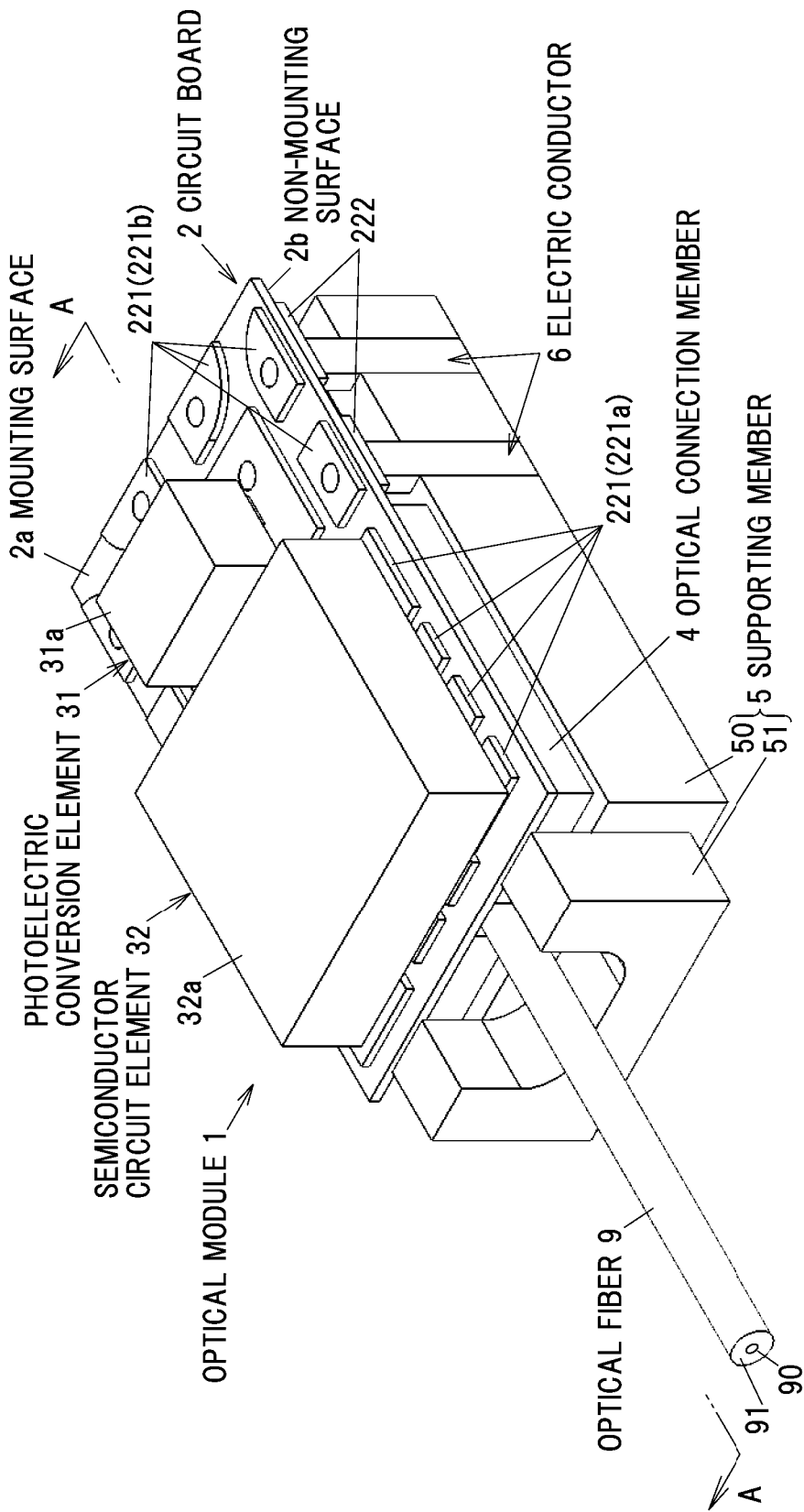
FIG. 1 is a perspective view schematically showing an optical module according to a first embodiment of the invention.
Figure 2:
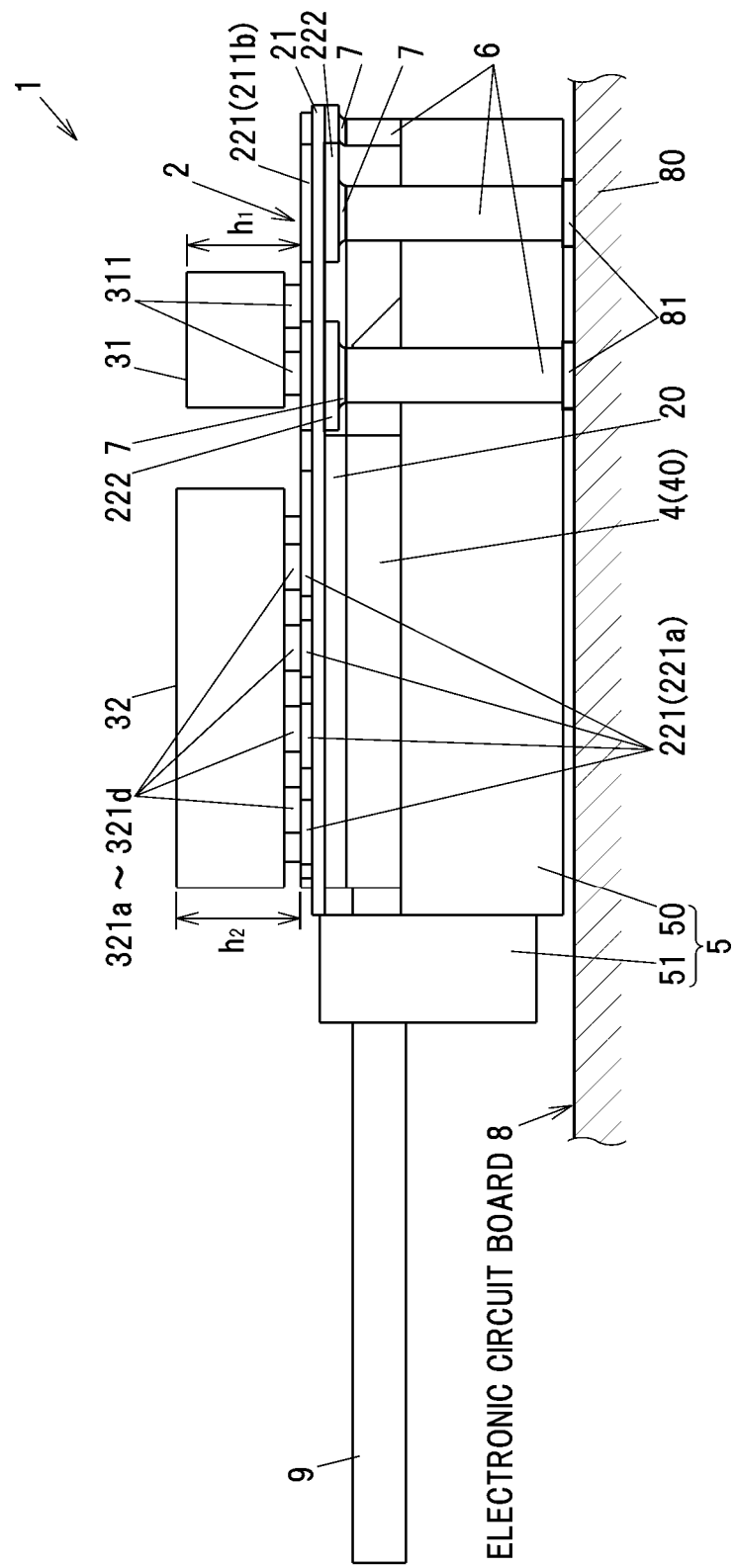
FIG. 2 is a side view schematically showing a state that the optical module is mounted in an electronic circuit board.
Figure 3:
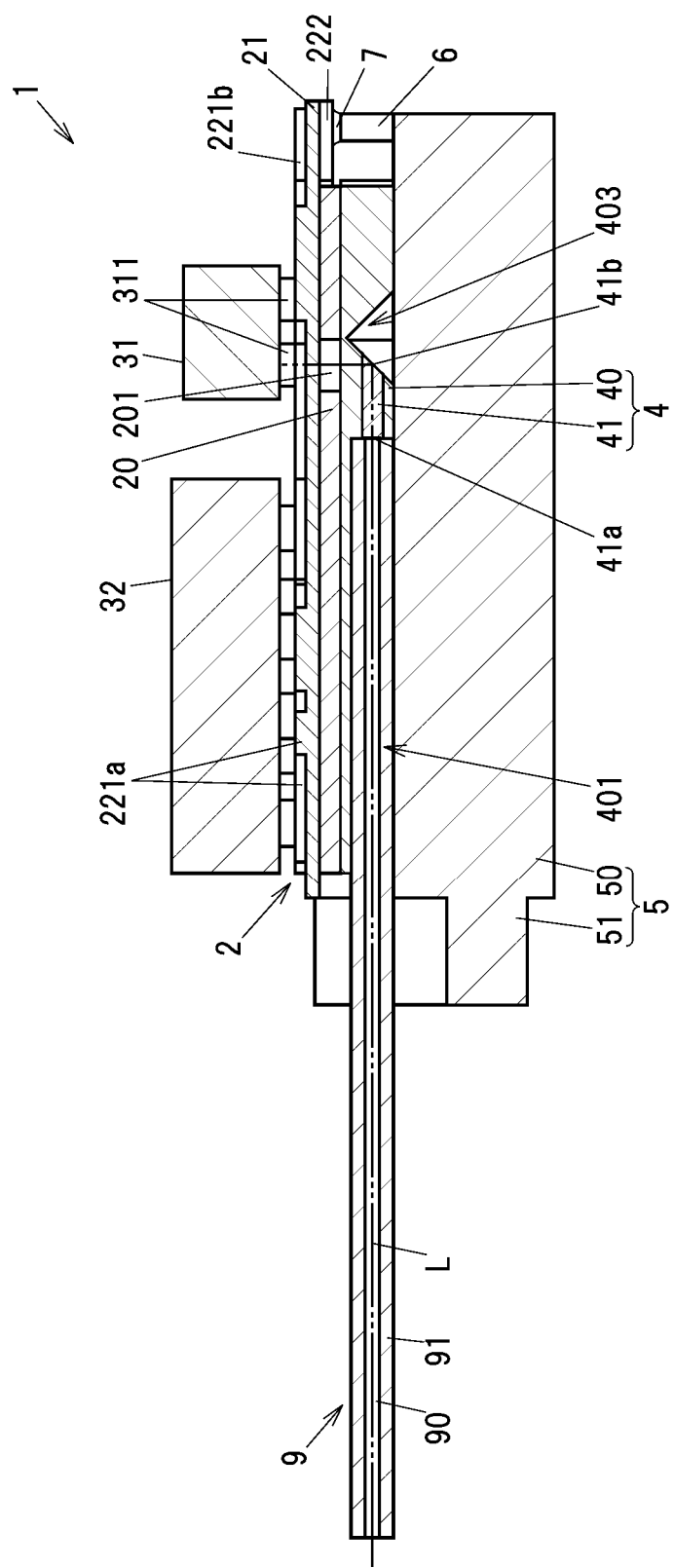
FIG. 3 is a cross-sectional view taken along the line A-A in FIG. 1.

FIG. 1 is a perspective view schematically showing the optical module 1 according to the embodiment of the invention. FIG. 2 is a side view schematically showing a state that the optical module 1 is mounted in the electronic circuit board 8. FIG. 3 is a line A-A cross-sectional view of the optical module 1 taken along the axis line of the optical fiber 9 mounted in the optical module 1.

As shown in FIG. 2, the optical module 1 is used in a state that it is mounted in the electronic circuit board 8. The electronic circuit board 8 is, for example, a glass epoxy substrate formed by laminating plural copper foils 81 to a plate-shaped substrate 80 obtained by impregnating glass fibers with epoxy resin and applying heat curing processing thereto. In addition, the electronic circuit board 8 can be a flexible printed circuit (FPC) configured such that electric wiring is formed in a polyimide substrate. The electronic circuit board 8, in which electronic components (not shown) such as a central processing circuit (CPU), a memory element are mounted, is configured to transmit or receive a signal to and from the other electronic circuit board or an electronic device by an optical communication that uses the optical fiber 9 mounted in the optical module 1 as a transmission medium.

The optical module 1 includes the circuit board 2 having flexibility and translucency, the photoelectric conversion element 31 mounted on the mounting surface 2a of the circuit board 2, and the optical connection member 4 optically connecting the photoelectric conversion element 31 and the optical fiber 9, the semiconductor circuit element 32 mounted on the mounting surface 2a of the circuit board 2 and electrically connected to the photoelectric conversion element 31, the supporting member 5 arranged so as to sandwich the optical connection member 4 between the circuit board 2, and the electric conductor 6 supported by the supporting member 5 so as to extend in a thickness direction of the supporting member 5, one end thereof being connected to the electrode 222 disposed on the non-mounting surface 2b of the circuit board 2.

In addition, in the embodiment, the coverlay 20 comprised of an insulating resin (shown in FIGS. 2, 3) is disposed in the side of the optical connection member 4 of the circuit board 2. In addition, the coverlay 20 and the circuit board 2 and the optical connection member 4, and the optical connection member 4 and the supporting member 5 are fixed with each other by a fixing means such as adhesive bonding.

The optical module 1 is configured such that the whole length along an extension direction of the optical fiber 9 is, for example, 2.0 mm, and the dimension in a width direction perpendicular to the above-mentioned direction is, for example, 1.0 mm. In addition, the optical module 1 is configured such that the dimension in a height direction of the optical module 1 (in a direction perpendicular to the electronic circuit board 8) is, for example, 1.0 mm.

The photoelectric conversion element 31 is an element configured to convert electric energy to light, or light to electric energy. As an example of the formed, a semiconductor laser element, and a light emitting diode (LED) are included. In addition, as an example of the latter, a photo diode is included. The photoelectric conversion element 31 is configured to emit or receive the light via a light receiving/emitting part (not shown) formed in a surface facing the circuit board 2. Underfill is filled between the photoelectric conversion element 31 and the circuit board 2.

In case that the photoelectric conversion element 31 is an element configured to convert electric energy to light, the semiconductor circuit element 32 is a driver IC configured to drive the photoelectric conversion element 31 based on an electric signal input from the electronic circuit board 8. In addition, in case that the photoelectric conversion element 31 is an element configured to convert the light received to electric energy, the semiconductor circuit element 32 is a pre-amplifier IC configured to amplify an electric signal input from the photoelectric conversion element 31 so as to output to the side of the electronic circuit board 8.

As shown in FIG. 1, the semiconductor circuit element 32 has a mounting area (a projection area of the semiconductor circuit element 32 if viewed from a direction perpendicular to the mounting surface 2*a*) larger than the photoelectric conversion element 31. Namely, the top surface 32*a* of the semiconductor circuit element 32 has a larger area than the top surface 31*a* of the photoelectric conversion element 31. In the embodiment, the semiconductor circuit element 32 has the mounting area 6.5 times larger than the photoelectric conversion element 31. In addition, the semiconductor circuit element 32 has a thickness thicker than the circuit board 2 and has a rigidity higher than the circuit board 2.

In addition, as shown in FIG. 2, the semiconductor circuit element 32 has a height ($h_2$) from the mounting surface 2*a* of the circuit board 2 (a distance from the surface of the electrode 221 to the top surface 32*a* of the semiconductor circuit element 32) higher than a height ($h_1$) of the photoelectric conversion element 31 from the mounting surface 2*a* of the circuit board 2 (a distance from the surface of the electrode 221 to the top surface 31*a* of the photoelectric conversion element 31), namely ($h_2$)>($h_1$).

Further, in the embodiment, a case that one photoelectric conversion element 31 and one semiconductor circuit element 32 are respectively mounted in the circuit board 2 is explained, a case that the photoelectric conversion elements 31 and the semiconductor circuit elements 32 are plurally mounted therein can be also adopted.

Figure 4A:
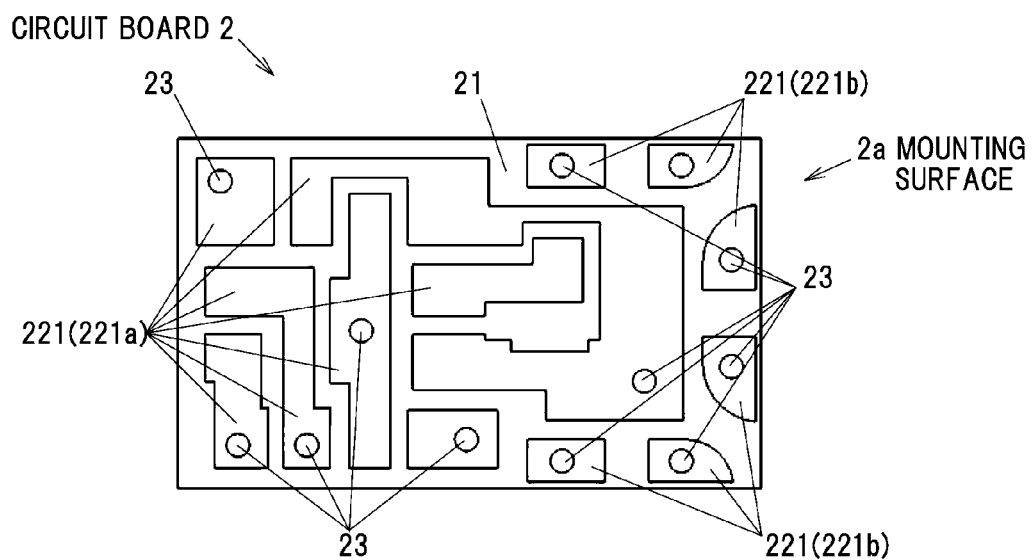
FIG. 4A is a plan view schematically showing a mounting surface of a circuit board.
Figure 4B:
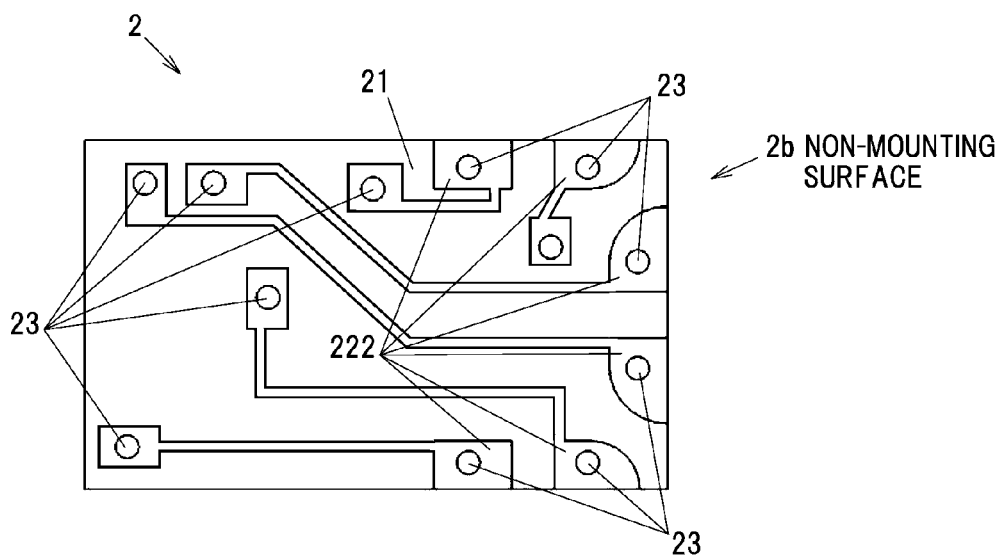
FIG. 4B is a plan view schematically showing a non-mounting surface of a circuit board.

FIG. 4A is a plan view schematically showing the mounting surface 2*a* of the circuit board 2, and FIG. 4B is a plan view schematically showing the non-mounting surface 2*b* of the circuit board 2.

The circuit board 2 is a flexible substrate configured such that the electrodes 221, 222 comprised of an electrically-conductive metal foil are plurally disposed on the surface of the substrate 21 comprised of an insulating material that has flexibility and translucency and is formed in a film-like shape. The circuit board 2 has a rectangular shape in which a direction that the photoelectric conversion element 31 and the semiconductor circuit element 32 are aligned (a horizontal direction in FIGS. 4A, 4B) is corresponding to a longitudinal direction. The electrodes 221 are plurally disposed in the mounting surface 2*a* in which the photoelectric conversion element 31 and the semiconductor circuit element 32 are mounted. The electrodes 222 are plurally disposed in the non-mounting surface 2*b* on the back side of the mounting surface 2*a*.

Plural (six in the embodiment) electric conductors 6 are each soldered to the electrodes 222 so that the electrodes 222 and the electric conductors 6 are electrically connected to each other by the solder 7 (refer to FIGS. 2, 3). The electrodes 221 in the mounting surface 2*a* are classified into an electrode for connection 221*a* and an electrode for test 221*b* according to the function. The electrode for connection 221*a* is an electrode configured to be connected to terminals (described below) such as a terminal 311 of the photoelectric conversion element 31 or terminals 321*a* to 321*d* of the semiconductor circuit element 32 by soldering.

The electrode for test 221*b* is an electrode configured to carry out an operation test of the optical module 1 in a state of a single body that the optical module 1 is not mounted on the electronic circuit board 8, and directly connected to the electrodes 222 via through holes 23 respectively. A probe for the operation test has contact with the electrode for test 221*b*, so as to supply the power source and input and output the test signal via the probe. In the embodiment, plural (six) electrodes for test 221*b* are arranged on the periphery of the photoelectric conversion element 31. The electrodes for test 221*b* are electrically connected to any of the electrodes for connection 221*a* by wiring electrodes (not shown).

Figure 5B:
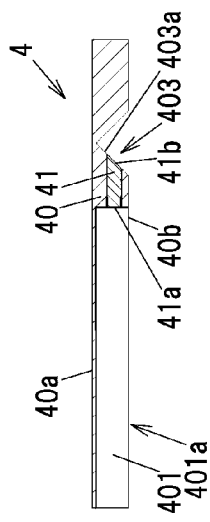
FIG. 5B is a cross-sectional view taken along the line B-B in FIG. 5A.
Figure 5D:
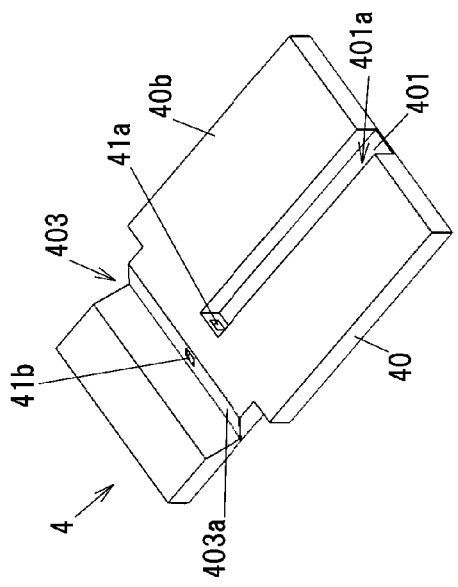
FIG. 5D is a perspective view schematically showing the optical connection member.
Figure 5A:
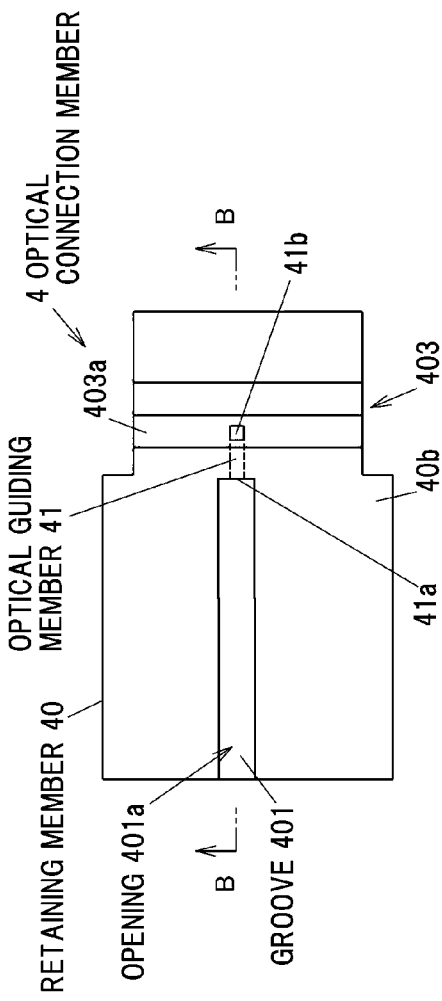
FIG. 5A is a plan view schematically showing an optical connection member.
Figure 5C:
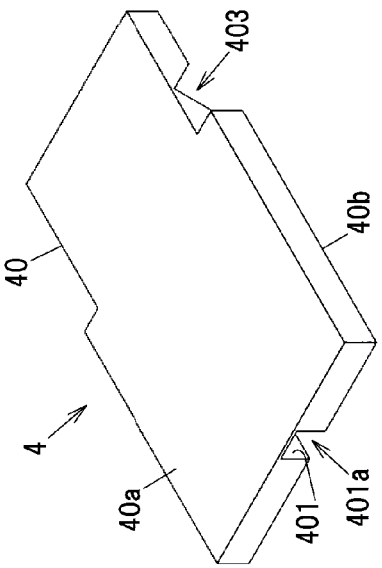
FIG. 5C is a perspective view schematically showing the optical connection member.

FIG. 5A is a plan view schematically showing the optical connection member 4, FIG. 5B is a cross-sectional view taken along the line B-B in FIG. 5A, FIG. 5C is a perspective view schematically showing the optical connection member 4 and FIG. 5D is a perspective view schematically showing the optical connection member 4.

The optical connection member 4 includes a retaining member 40 configured to retain the optical fiber 9 and an optical guiding member 41 configured to guide an emission light emitted from the optical fiber 9. Both of the retaining member 40 and the optical guiding member 41 have translucency in a wavelength of the propagation light propagating the optical fiber 9, and the optical guiding member 41 has refractive index higher than the retaining member 40. The retaining member 40 and the optical guiding member 41 are comprised of, for example, a polyimide resin, an acrylic resin or an epoxy resin.

The retaining member 40 is shaped like a flat plate, and includes a front surface 40*a* that is flat and faces to the coverlay 20 and a rear surface 40*b* that is parallel to the front surface 40*a* and faces to the supporting member 5. The retaining member 40 has a groove 401 on the side of the rear surface 40*b*, the groove 401 being configured to open at the side of the supporting member 5 so as to house the tip of the optical fiber 9. The groove 401 is formed so as to extend along a direction that the semiconductor circuit element 32 and the photoelectric conversion element 31 are aligned, and to become depressed toward the front surface 40*a* from the rear surface 40*b* of the retaining member 40 in a thickness direction of the retaining member 40.

The groove 401 has an opening 401*a* that is formed in a band-like shape, into which the optical fiber 9 is pushed, at the side of the rear surface 40*b* (at the side of the supporting member 5). The optical fiber 9 is pushed into the retaining member 40 from the opening 401*a* in a thickness direction of the retaining member 40 so as to be housed in the groove 401. In addition, as shown in FIG. 3, the groove 401 is formed between the semiconductor circuit element 32 and the supporting member 5, and the circuit board 2 and the semiconductor circuit element 32 are stacked in a direction that optical fiber 9 is pushed.

Furthermore, the retaining member 40 includes a notch 403 formed at the side of the rear surface 40b. The notch 403 is formed so as to cross over from one side surface to another side surface of the retaining member 40, and the extension direction thereof is perpendicular to the central axis of the electric conductor 6. In addition, the notch 403 has a triangle shape in a side view, and the optical guiding member 41 is terminated by the notch surface 403a thereof. The notch surface 403a forms an angle of for example, 45 degrees with the rear surface 40b.

The optical guiding member 41 has an input/output surface 41a corresponding to an opening of the side of the groove 401 and a reflection surface 41b corresponding to a slope terminated by the notch surface 403a of the notch 403. The input/output surface 41a is disposed at a location that faces the core 90 configured to be surrounded by the clad layer 91 of the optical fiber 9 retained by the groove 401 as shown in FIG. 1. The reflection surface 41b is configured to reflect the light emitted from the photoelectric conversion element 31 to the side of the input/output surface 41a, or to reflect the light input from the input/output surface 41a to the side of the photoelectric conversion element 31. Further, the notch 403 can be configured such that a metal film is formed on the notch surface 403a, and further the notch 403 can be configured to be filled with a resin.

In the embodiment, if the optical module 1 is viewed from a side of the mounting surface 2a, the input/output surface 41a is located between the photoelectric conversion element 31 and the semiconductor circuit element 32. Namely, the groove 401 is formed so as to pass through between the semiconductor circuit element 32 and the supporting member 5 in a longitudinal direction of the circuit board 2 (in an extension direction of the optical fiber 9).

As shown in FIGS. 2, 3, the tip of the optical fiber 9 housed in the groove 401 of the retaining member 40 is sandwiched between the retaining member 40 (the bottom surface of the groove 401) and the supporting member 5.

Figure 6A:
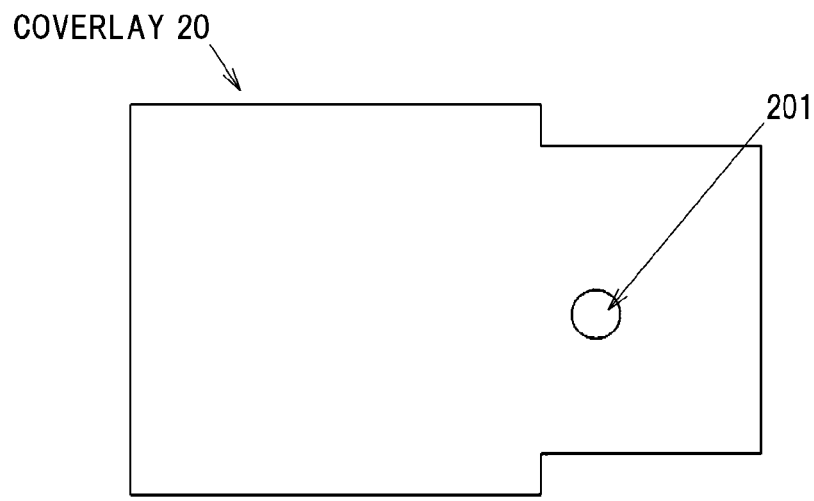
FIG. 6A is a plan view schematically showing a coverlay.
Figure 6B:
FIG. 6B is a side view schematically showing the coverlay.
Figure 6C:
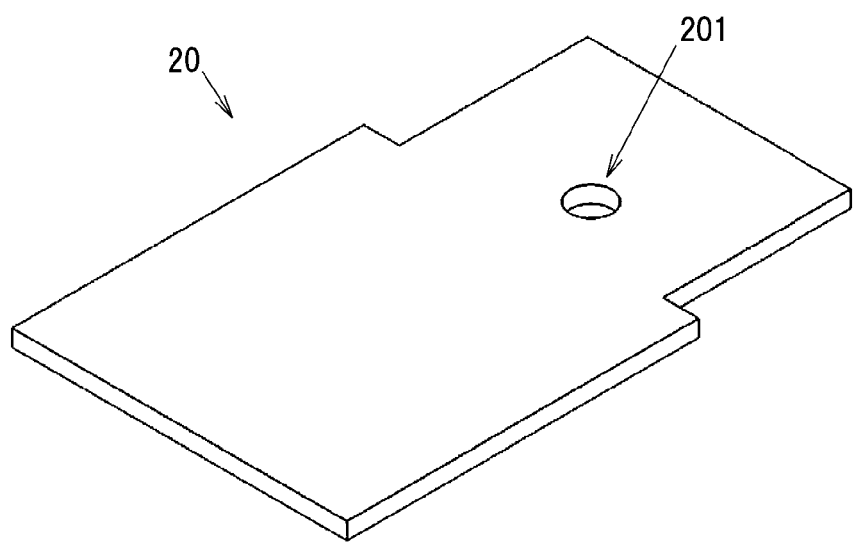
FIG. 6C is a perspective view schematically showing the coverlay.

FIGS. 6A, 6B and 6C are a plan view, a side view and a perspective view respectively showing the coverlay 20.

The coverlay 20 is an insulating material that is shaped like a flat plate, comprised of, for example, a polyimide resin, an acrylic resin or an epoxy resin, and has a through hole 201 formed at a location corresponding to the reflection surface 41b of the optical connection member 4. The coverlay 20 is formed so as to have a size and a shape that cover the whole surface of the surface 40a of the optical connection member 4 (the retaining member 40). In the embodiment, one flat surface of the coverlay 20 that faces the surface 40a is congruent to the surface 40a except for the through hole 201.

Figure 7:
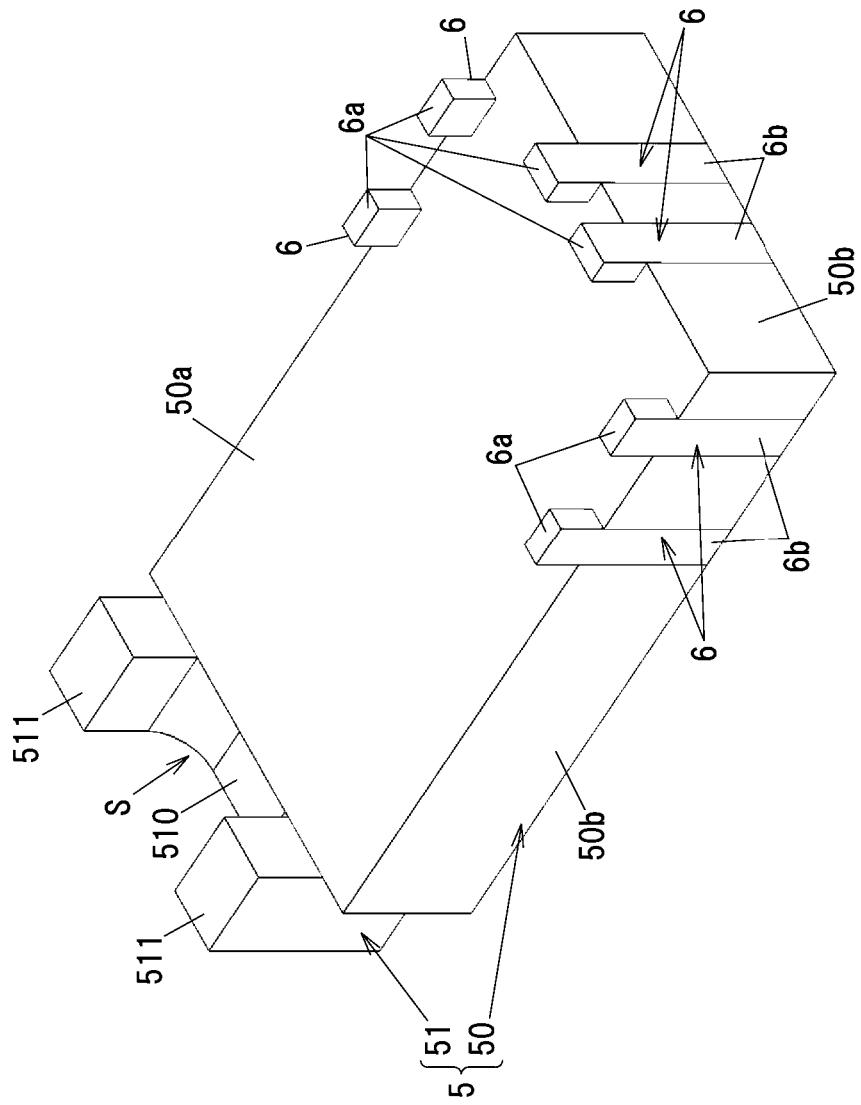
FIG. 7 is a perspective view schematically showing a supporting member and an electric conductor.

FIG. 7 is a perspective view schematically showing the supporting member 5 and the electric conductor 6. The supporting member 5 is comprised of, for example, an insulating resin such as a polyimide resin, and integrally includes a main body 50 having a rectangular parallelepiped shape, and a storage part 51 configured to store an adhesive used for fixing the optical fiber 9. The electric conductor 6 is comprised of a metal having electric conductivity, such as copper to which a nickel soldering and a gold soldering are applied.

The electric conductor 6 is supported by the side surface 50b of the main body 50. In the embodiment, plural (six) electric conductors 6 are formed by a mold forming so as to be integrated with the main body 50, and the side surfaces 6b of the electric conductors 6 are exposed at the side of the side surfaces 50b of the main body 50. In addition, one end part of the electric conductor 6 projects from the top surface 50a of the main body 50 toward the side of the circuit board 2.

The end surface 6a of the electric conductor 6 projecting from the top surface 50a faces the electrode 222 of the circuit board 2. In addition, one end part of the electric conductor 6 projecting from the top surface 50a functions as a positioning member configured to carry out positioning of the optical connection member 4 and the coverlay 20 when the optical module 1 is assembled.

The main body 50 has a thickness of, for example, not more than 0.5 mm, and has a certain level of optical transparency, thus the optical fiber 9 housed in the groove 401 can be visually confirmed from the rear surface opposite to the top surface 50a. This makes it possible to carry out a work for disposing the optical fiber 9 while confirming the position of the optical fiber 9.

The storage part 51 is formed in conjunction with the side surface of the main body 50. The storage part 51 is formed to have a U-like shape that has an opening on the side of the top surface 50a of the main body 50, and includes a bottom wall 510 and a pair of side walls 511 having a quadrangular prism shape that project from both end parts of the bottom wall 510 toward the side of the top surface 50a. The space (S) formed between the pair of side walls 511 is a storage space configured to accept an adhesive (not shown) for fixing the optical fiber 9 after it is inserted into the groove 401 of the optical connection member 4, and store the adhesive until it is solidified.

Figure 8:
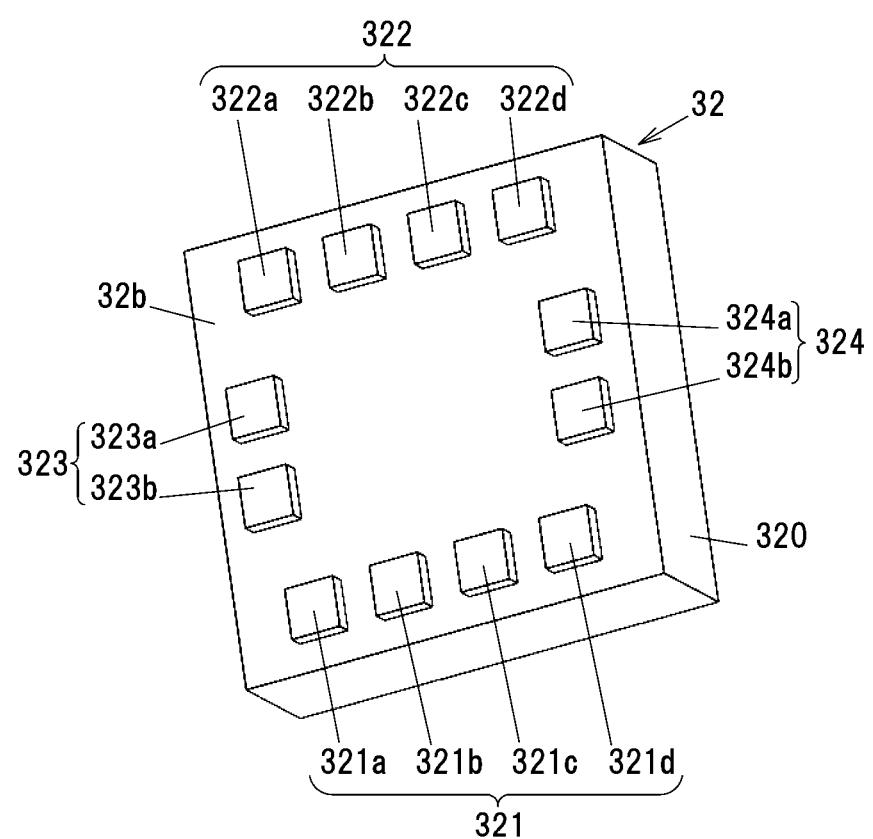
FIG. 8 is a perspective view schematically showing a semiconductor circuit element.
Figure 9:
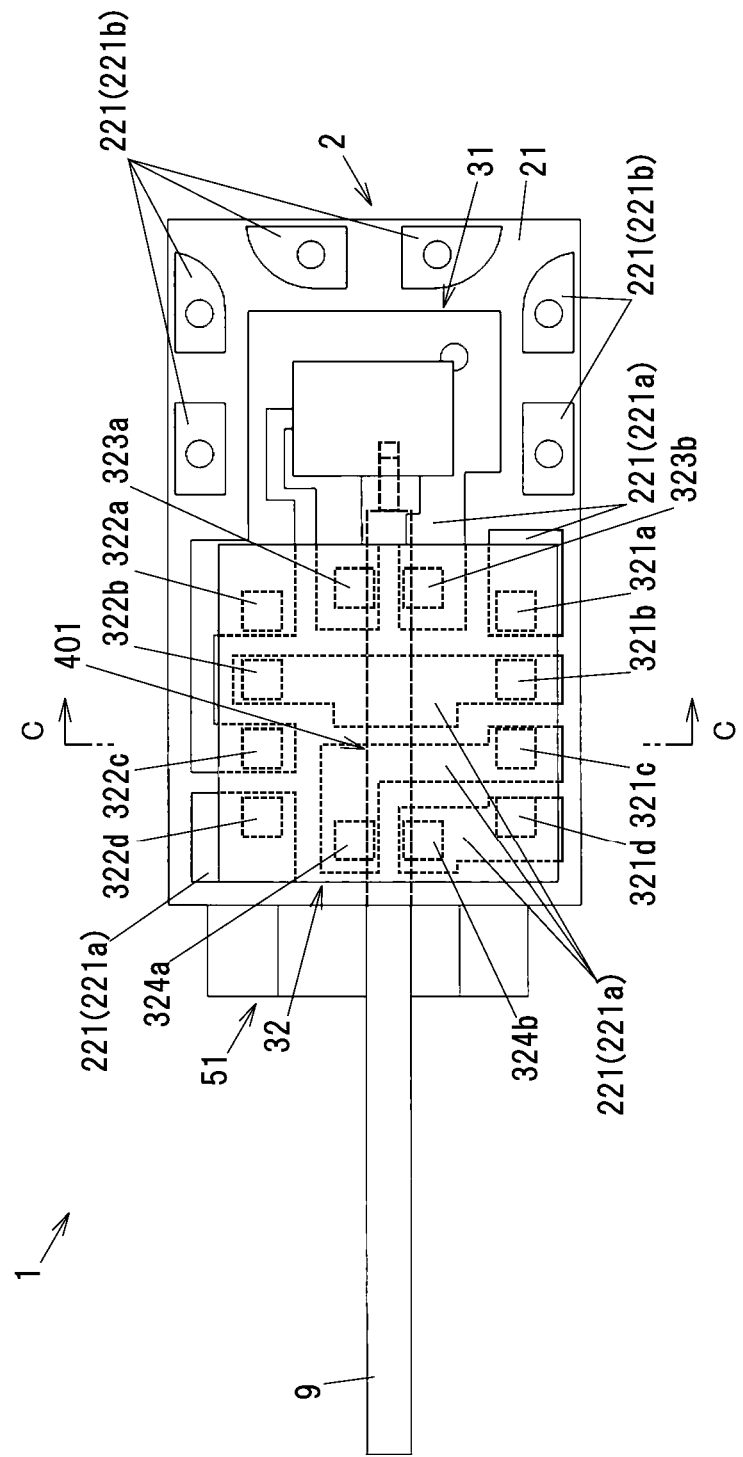
FIG. 9 is a plan view schematically showing the optical module in which constituent elements in the bottom surface side of the semiconductor circuit element are shown in broken lines.
Figure 10:
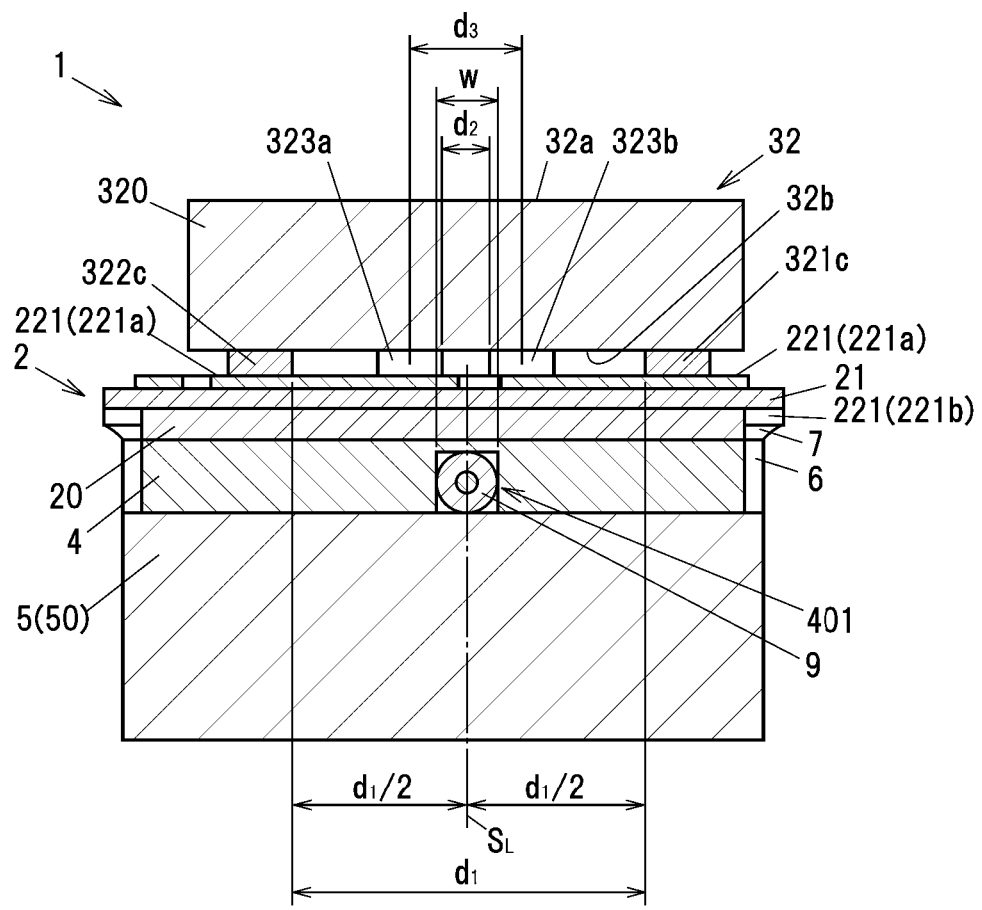
FIG. 10 is a cross-sectional view taken along the line C-C in FIG. 9.

FIG. 8 is a perspective view schematically showing the semiconductor circuit element 32, if viewed from the side of the bottom surface 32b opposite to the top surface 32a (shown in FIG. 1). FIG. 9 is a plan view schematically showing the optical module 1 in which constituent elements in the side of the bottom surface 32b of the semiconductor circuit element 32 are shown in broken lines. FIG. 10 is a cross-sectional view taken along the line C-C in FIG. 9

The semiconductor circuit element 32 includes twelve terminals 321a to 321d, 322a to 322d, 323a, 323b, 324a, and 324b in the side of the bottom surface 32b. In an example shown in FIG. 8, each terminal has a quadrangular shape, but not limited to this, a circular shape and a hemispherical shape can be also adopted. In addition, such a configuration can be also adopted, that each terminal is disposed in the side surfaces of the semiconductor circuit element 32, and has a shape formed so as to be inflected toward the side of the circuit board 2. In addition, underfill is filled between the semiconductor circuit element 32 and the circuit board 2.

Further, in the embodiment, the whole of the surface of each terminal becomes a connection point connected to the electrode 221a, but in case of a hemispherical shape, the tip thereof becomes the connection point with the electrode 221a. In addition, if each terminal has a shape formed so as to be inflected from the side surface of the semiconductor circuit element 32 toward the side of the circuit board 2, the tip thereof becomes the connection point with the electrode 221a.

In the bottom surface 32b of the semiconductor circuit element 32, plural (four) terminals 321a to 321d arranged linearly constitute a first terminal row 321. In addition, similarly, plural (four) terminals 322a to 322d arranged linearly constitute a second terminal row 322. The first terminal row 321 and the second terminal row 322 are configured to be parallel to each other. As shown in FIG. 9, the semiconductor circuit element 32 is connected to the electrode 221a of the circuit board 2 such that the groove 401 is sandwiched between the terminals 321a to 321d of the first terminal row 321 and the terminals 322a to 322d of the second terminal row 322.

In detail, as shown in FIG. 10, the first terminal row 321 and the second terminal row 322, and the groove 401 are arranged so as to be out of alignment in a thickness direction of the circuit board 2, if the groove 401 is viewed from the side of the mounting surface 2a while seeing through the circuit board 2, the first terminal row 321 is arranged in one part (lower part of FIG. 9) of the region in which the groove 401 exists, and the second terminal row 322 is arranged in another part (upper part of FIG. 9) of the region respectively.

As shown in FIG. 10, the distance ($d_1$) between the first terminal row 321 (the terminals 321a to 321d) and the second terminal row 322 (the terminals 322a to 322d) is more than the width (w) of the groove 401, namely ($d_1$)>(w). In the embodiment, the distance ($d_1$) is configured to be approximately 5.5 times more than the width (w).

The intermediate position of the first terminal row 321 and the second terminal row 322 (the position obtained when one-half of the distance ($d_1$) is displaced from the first terminal row 321 to the side of the second terminal row 322, or from the second terminal row 322 to the side of the first terminal row 321) is a position corresponding to the groove 401. Namely, a straight line ($S_L$) that passes through the intermediate position and is perpendicular to the circuit board 2 intersects with the groove 401.

In addition, the terminals 323a and 323b disposed between the first terminal row 321 and the second terminal row 322 constitute a third terminal row. Similarly, the terminals 324a and 324b disposed between the first terminal row 321 and the second terminal row 322 constitute a fourth terminal row 324. Namely, the third terminal row 323 is configured such that the terminals 323a and 323b are arranged between the first terminal row 321 and the second terminal row 322. In addition, similarly, the fourth terminal row 324 is configured such that the terminals 324a and 324b are arranged between the first terminal row 321 and the second terminal row 322.

The terminals 323a and 323b are arranged so as to sandwich the groove 401. In addition, the terminals 324a and 324b are arranged so as to sandwich the groove 401, at the location closer to the storage part 51 than the terminals 323a and 323b. Further, the positional relationship between the third terminal row 323 and the fourth terminal row 324 can be reversed with each other. Namely, the terminals 323a and 323b can be arranged at the location closer to the storage part 51 and the terminals 324a and 324b can be arranged at the location closer to the photoelectric conversion element 31 respectively.

As shown in FIG. 10, the distance ($d_2$) between the terminal 323a and the terminal 323b of the third terminal row 323 is less than the width (w) of the groove 401, namely ($d_2$)<(w). In the embodiment, the distance ($d_2$) is configured to be approximately 80% of the width (w). In addition, the distance ($d_3$) between the centers of the terminal 323a and the terminal 323b of the third terminal row 323 is not less than the width (w) of the groove 401, namely ($d_3$)≥(w). In the embodiment, the distance ($d_3$) is configured to be approximately 2 times more than the width (w). The distance between the terminal 324a and the terminal 324b of the fourth terminal row 324 is configured to be equal to the distance ($d_2$) between the terminal 323a and the terminal 323b. In addition, the distance between the centers of the terminal 324a and the terminal 324b of the fourth terminal row 324 is configured to be equal to the distance ($d_3$) between the centers of the terminal 323a and the terminal 323b.

In addition, as shown in FIG. 9, the terminals 323a, 323b, 324a and 324b are configured such that at least a part of at least one terminal faces the groove 401 via the circuit board 2. In the embodiment, parts located at the side of the central axis of the groove 401 of the terminals 323a, 323b, 324a and 324b face the groove 401 via the circuit board 2 respectively.

Operation of Optical Module 1

Next, the operation of the optical module 1 will be explained referring to FIG. 3. Here, a case that the photoelectric conversion element 31 is a vertical cavity surface emitting laser (VCSEL) and the semiconductor circuit element 32 is a driver IC configured to drive the photoelectric conversion element 31 will be mainly explained.

The optical module 1 configured to operate when the operation power source is supplied from the electronic circuit board 8. The operation power source is input to the photoelectric conversion element 31 and the semiconductor circuit element 32 via the electric conductor 6 and the circuit board 2. In addition, a signal to be transmitted by using the optical fiber 9 as a transmission medium is input to the semiconductor circuit element 32 from the electronic circuit board 8 via the electric conductor 6 and the circuit board 2. The semiconductor circuit element 32 is configured to drive the photoelectric conversion element 31 based on the signal input.

The photoelectric conversion element 31 is configured to emit a laser light from the light receiving/emitting part formed in the surface facing the circuit board 2 toward the mounting surface 2a of the circuit board 2 in a direction perpendicular to the mounting surface 2a. In FIG. 3, the light path (L) of the laser light is shown by an alternate long and two short dashes line.

The laser light permeates through the substrate 21 of the circuit board 2, passes through the through hole 201 of the coverlay 20 and enters into the optical connection member 4. The laser light that has entered into the optical connection member 4 reflects at the reflection surface 41b, so as to enter into the core 90 of the optical fiber 9 from the input/output surface 41a while being led by the optical guiding member 41.

Further, in case that the photoelectric conversion element 31 is, for example, a photo diode, and the semiconductor circuit element 32 is a pre-amplifier IC, the travelling direction of the light is reversed in comparison with the above-mentioned case, and the photoelectric conversion element 31 converts the light signal received to electric signal so as to output to the semiconductor circuit element 32. The semiconductor circuit element 32 amplifies the electric signal so as to output to the side of the electronic circuit board 8 via the electric conductor 6 and the circuit board 2.

Configuration of Optical Transmission Device 10

FIG. 11 is a perspective view schematically showing one composition example of the optical transmission device 10. The optical transmission device 10 includes a pair of the optical modules 1 and the optical fiber 9 configured such that both end parts thereof are connected to a pair of the optical modules 1. One optical module 1 of a pair of the optical modules 1 is a transmitting end and another optical module 1 is a receiving end. In the following explanation, the optical module 1 of a transmitting end will be referred to as the transmitting end optical module 1A, and the optical module 1 of a receiving end is referred to as the receiving end optical module 1B.

The photoelectric conversion element 31 of the transmitting end optical module 1A is, for example, VCSEL, and similarly the semiconductor circuit element 32 of the transmitting end optical module 1A is a driver IC configured to supply the electric power for allowing the photoelectric conversion element 31 to emit the laser light.

In addition, the photoelectric conversion element 31 of the receiving end optical module 1B is, for example, a photo diode, and similarly the semiconductor circuit element 32 of the receiving end optical module 1B is a pre-amplifier IC configured to amplify the signal converted to the electric signal by the photoelectric conversion element 31.

The optical transmission device 10 is configured such that the transmitting end optical module 1A converts the signal input from the electronic circuit board 8 (not shown) in the side of the transmitting end optical module 1A to an optical signal so as to enter into the optical fiber 9, and the receiving end optical module 1B converts the optical signal to an electric signal, and amplifies the electric signal so as to output to the electronic circuit board 8 (not shown) in the side of the receiving end optical module 1B. This makes it possible to carry out an optical communication among plural electronic circuit boards 8, 8.

Manufacturing Method of Optical Transmission Device 10

FIG. 12 is an explanatory view schematically showing one example of a manufacturing process of the optical transmission device 10 according to the embodiment.

The optical transmission device 10 is manufactured by assembling a first assembly 11 configured such that the supporting member 5 and the electric conductors 6 are integrated with each other, and a second assembly 12 configured such that the coverlay 20 and the optical connection member 4 are integrated with the circuit board 2 in which the photoelectric conversion element 31 and the semiconductor circuit element 32 are mounted, while sandwiching the optical fiber 9 in a radial direction. Since the first assembly 11 and the second assembly 12 are respectively assembled by a well-known method, hereinafter, a process for assembling the first assembly 11 and the second assembly 12 with each other will be explained.

As shown in FIG. 12, the process for assembling the first assembly 11 and the second assembly 12 with each other includes an arrangement step of arranging the end part of the optical fiber 9 to the side of the opening 401a of the groove 401 of the optical connection member 4, and a pushing step of bringing a pushing member 801 having a flat pushing surface 801a into contact with the semiconductor circuit element 32, and pushing the optical connection member 4 to the side of the supporting member 5 via the semiconductor circuit element 32 and the circuit board 2 so as to push the optical fiber 9 into the groove 401.

In the arrangement step, the first assembly 11 is mounted on a mounting surface 800a of a supporting platform 800, and the optical fiber 9 is positioned on the top surface 50a of the supporting member 5 so as to face the opening 401a.

In the pushing step, the pushing surface 801a of the pushing member 801 is brought into surface-contact with the top surface 32a of the semiconductor circuit element 32, and the pushing member 801 is moved to the side of the supporting platform 800, while the pushing surface 801a maintains the attitude of becoming parallel to the mounting surface 800a of the supporting platform 800. Due to this, the optical connection member 4 is pushed to the side of the supporting member 5 by a pushing force of the pushing member 801, and the optical fiber 9 is pushed into the groove 401 from the opening 401a. At this time, the optical connection member 4 and the circuit board 2 try to be distorted in shape so as to be bent with focus on the groove 401 based on a reaction force from the optical fiber 9, but this distortion in shape is prevented by the semiconductor circuit element 32.

Further, before the pushing step, the top surface 50a of the supporting member 5 and the peripheral surface of the optical fiber 9 can be coated with an adhesive.

Effects and Advantages of the Embodiment

According to the embodiment, the following effects and advantages can be obtained.

(1) The semiconductor circuit element 32 and the optical fiber 9 are arranged so as to be overlapped with each other in a thickness direction of the circuit board 2, while sandwiching the circuit board 2, thus the length of the groove 401 in which the optical fiber 9 is housed can be ensured while the whole length of the optical module 1 is prevented from enlargement, consequently the optical module 1 can be reduced in size while the retention rigidity of the optical fiber 9 is maintained.

(2) The circuit board 2 and the semiconductor circuit element 32 are stacked in a direction that the optical fiber 9 is pushed into the groove 401 of the optical connection member 4, thus the distortion in shape of the circuit board 2 due to pushing the optical fiber 9 into the groove 401 can be prevented by the semiconductor circuit element 32. Namely, even if the circuit board 2 is pushed up to the side of the semiconductor circuit element 32 due to the pushing of the optical fiber 9, the electrodes 221a of the circuit board 2 are respectively connected to each terminal of the first and the second terminal rows 321, 322 of the semiconductor circuit element 32, thus the distortion in shape of the circuit board 2 can be prevented by tension due to the above-mentioned terminals.

(3) The intermediate position of the first terminal row 321 and the second terminal row 322 is a position corresponding to the groove 401, thus the distortion in shape of the circuit board 2 can be prevented in a balanced manner, namely without being extremely biased toward any one of the first terminal row 321 and the second terminal row 322.

(4) The terminals 323a, 323b of the third terminal row 323 and the terminals 324a, 324b of the fourth terminal row 324 are configured such that parts of the terminals face the groove 401 via the circuit board 2, thus the distortion in shape of the circuit board 2 due to pushing the optical fiber 9 into the groove 401 is pushed back by the terminals 323a, 323b, 324a and 324b, consequently it can be further prevented.

(5) The distance between the centers of the terminal 323a and the terminal 323b of the third terminal row 323, and the distance between the centers of the terminal 324a and the terminal 324b of the fourth terminal row 324 are not less than the width of the groove 401, thus the distortion in shape of the circuit board 2 can be prevented in a further balanced manner.

(6) The groove 401 is formed so as to pass through between the semiconductor circuit element 32 and the supporting member 5 in a longitudinal direction of the circuit board 2, thus, for example, in comparison with a case that the groove 401 is formed so as not to pass through between the semiconductor circuit element 32 and the supporting member 5, and the input/output surface 41a is formed between the semiconductor circuit element 32 and the supporting member 5, the length of the optical fiber 9 that is retained by the groove 401 can be lengthened, consequently the retention rigidity thereof can be heightened.

(7) The height ($h_2$) of the semiconductor circuit element 32 from the mounting surface 2a of the circuit board 2 is higher than the height ($h_1$) of the photoelectric conversion element 31 from the mounting surface 2a of the circuit board 2, thus the pushing surface 801a can be brought into surface-contact with the top surface 32a of the semiconductor circuit element 32, without bringing the pushing surface 801a into contact with the top surface 31a of the photoelectric conversion element 31, when the pushing member 801 is moved to the side of the supporting platform 800. This makes it possible to push the optical fiber 9 arranged on the lower side of the semiconductor circuit element 32 (in the side of the supporting platform 800) into the groove 401 appropriately while preventing it from being inclined. Further, even if the height ($h_2$) of the semiconductor circuit element 32 is lower than the height ($h_1$) of the photoelectric conversion element 31, it is not impossible to position the pushing member 801 with a high degree of accuracy and bring the pushing surface 801a into contact with only the top surface 32a of the semiconductor circuit element 32, but as mentioned above, the whole length of the optical module 1 is extremely short (for example, 1.3 mm), thus the above-mentioned positioning is practically difficult.

Although the invention has been described with respect to the specific embodiments and Examples for complete and clear disclosure, the appended claims are not to be thus limited. In particular, it should be noted that all of the combinations of features as described in the embodiment and Examples are not always needed to solve the problem of the invention.

The invention may be carried out by being appropriately modified without departing from the scope thereof. For example, in the embodiment, a case that one optical fiber 9 is mounted in the optical module 1 has been explained, but not limited to this, the optical module 1 can be configured such that the optical fibers 9 are plurally mounted therein.

What is claimed is:

1. An optical module, comprising:
a circuit board having flexibility;
an electrical-to-optical or optical-to-electrical transduction element mounted on a mounting surface of the circuit board to convert electrical energy into light, or light into electrical energy;
a semiconductor circuit element mounted on the mounting surface of the circuit board and electrically connected to the electrical-to-optical or optical-to-electrical transduction element to drive the electrical-to-optical transduction element based on an input electrical, or amplify an electrical signal input from the optical-to-electrical transduction element and output that amplified electrical signal;
a plate-shaped optical connection member having a groove into which an end part of an optical fiber is pushed so as to be housed and optically connecting the optical fiber and the electrical-to-optical or optical-to-electrical transduction element; and
a supporting member arranged so as to sandwich the optical connection member between the circuit board,
wherein the groove is formed between the semiconductor circuit element and the supporting member so as to have an opening into which the optical fiber is pushed at the supporting member side,
wherein the semiconductor circuit element has a height from the mounting surface of the circuit board higher than the electrical-to-optical or optical-to-electrical transduction element,
wherein the semiconductor circuit element comprises a first terminal row and a second terminal row each of which comprises a plurality of terminals connected to the electrodes of the circuit board and linearly arranged,
wherein the terminals of the first terminal row and the second terminal row are connected to the electrodes so as to sandwich the groove therebetween, and
wherein a distance between a connection point of the first terminal row to the electrodes and a connection point of the second terminal row to the electrodes is more than a width of the groove.

2. The optical module according to claim 1, wherein the semiconductor circuit element further comprises at least one terminal between the first terminal row and the second terminal row, at least a part of the one terminal facing the groove via the circuit board.

3. The optical module according to claim 1, wherein the semiconductor circuit element further comprises a third terminal row configured such that a plurality of terminals connected to the electrodes of the circuit board are arranged between the first terminal row and the second terminal row, and wherein a center-to-center distance between a pair of terminals of the third terminal row arranged so as to sandwich the groove is more than the width of the groove.

4. The optical module according to claim 1, wherein an intermediate position of the connection point of the first terminal row to the electrodes and the connection point of the second terminal row to the electrodes corresponds to the groove.

5. The optical module according to claim 1, wherein the groove is formed so as to pass through between the semiconductor circuit element and the supporting member in a longitudinal direction of the circuit board.

6. The optical module according to claim 1, wherein the semiconductor circuit element has rigidity higher than the circuit board.

7. The optical module according to claim 1, wherein the supporting member has optical transparency.

8. The optical module according to claim 3, wherein the distance between a pair of the terminals of the third terminal row arranged so as to sandwich the groove is less than the width of the groove.

9. An optical transmission device, comprising:
an optical fiber; and
an optical module connected to the end part of the optical fiber, wherein the optical module comprises:
a circuit board having flexibility;
an electrical-to-optical or optical-to-electrical transduction element mounted on a mounting surface of the circuit board to convert electrical energy into light, or light into electrical energy;
a semiconductor circuit element mounted on a mounting surface of the circuit board and electrically connected to the electrical-to-optical or optical-to-electrical transduction element to drive the electrical-to-optical transduction element based on an input electrical, or amplify an electrical signal input from the optical-to-electrical transduction element and output that amplified electrical signal;
a plate-shaped optical connection member having a groove into which an end part of an optical fiber is pushed so as to be housed and optically connecting the optical fiber and the electrical-to-optical or optical-to-electrical transduction element; and
a supporting member arranged so as to sandwich the optical connection member between the circuit board,
wherein the groove is formed between the semiconductor circuit element and the supporting member so as to have an opening into which the optical fiber is pushed at the supporting member side, and
wherein the semiconductor circuit element has a height from the mounting surface of the circuit board higher than the electrical-to-optical or optical-to-electrical transduction element, wherein the semiconductor circuit element comprises a first terminal row and a second terminal row each of which comprises a plurality of terminals connected to the electrodes of the circuit board and linearly arranged, wherein the terminals of the first terminal row and the second terminal row are connected to the electrodes so as to sandwich the groove therebetween, and wherein a distance between a connection point of the first terminal row to the electrodes and a connection point of the second terminal row to the electrodes is more than a width of the groove.

10. The optical transmission device according to claim 9, wherein the semiconductor circuit element further comprises at least one terminal between the first terminal row and the second terminal row, at least a part of the one terminal facing the groove via the circuit board.

11. The optical transmission device according to claim 9, wherein the semiconductor circuit element further comprises a third terminal row configured such that a plurality of terminals connected to the electrodes of the circuit board are arranged between the first terminal row and the second terminal row, and wherein a center-to-center distance between a pair of terminals of the third terminal row arranged so as to sandwich the groove is more than the width of the groove.

12. The optical transmission device according to claim 9, wherein an intermediate position of the connection point of the first terminal row to the electrodes and the connection point of the second terminal row to the electrodes corresponds to the groove.

13. The optical transmission device according to claim 9, wherein the groove is formed so as to pass through between the semiconductor circuit element and the supporting member in a longitudinal direction of the circuit board.

14. The optical transmission device according to claim 9, wherein the semiconductor circuit element has rigidity higher than the circuit board.

15. The optical transmission device according to claim 9, wherein the supporting member has optical transparency.

16. The optical transmission device according to claim 11, wherein the distance between a pair of the terminals of the third terminal row arranged so as to sandwich the groove is less than the width of the groove.

17. A method of manufacturing the optical transmission device according to claim 9, comprising: arranging the end part of the optical fiber in the opening side of the groove; and bringing a pushing member having a flat pushing surface into contact with the semiconductor circuit element, and pushing the optical connection member to the supporting member side via the semiconductor circuit element and the circuit board so as to push the optical fiber into the groove.

* * * * *